United States Patent Office 3,330,804
Patented July 11, 1967

3,330,804
USE OF CERTAIN BIS(3,5-SUBSTITUTED-4-HYDROXYBENZYLTHIO) COMPOUNDS AS ANTIOXIDANTS
Francis X. O'Shea, Wolcott, Conn., assignor to Uniroyal, Inc., a corporation of New Jersey
No Drawing. Original application Aug. 1, 1963, Ser. No. 299,197, now Patent No. 3,260,757, dated July 12, 1966. Divided and this application Apr. 29, 1966, Ser. No. 546,210
14 Claims. (Cl. 260—45.95)

ABSTRACT OF THE DISCLOSURE

Certain bis(3,5 - substituted-4-hydroxybenzylthio) compounds of the type $$HO-\underset{R'}{\overset{R}{\bigcirc}}-CH_2SXSCH_2-\underset{R'}{\overset{R}{\bigcirc}}-OH$$

as exemplified by 1,2-bis(3,5-di-t-butyl-4-hydroxybenzylthio) ethane, are used as antioxidants in rubbers, plastics, oil, etc.

---

This application is a division of my copending application Ser. No. 299,197, filed Aug. 1, 1963, now Patent No. 3,260,757.

This invention is concerned with a new series of compounds which are useful as antioxidants for rubber, plastics, fats, petroleum products and other organic materials normally subject to oxidative deterioration. The compounds of this invention are derived from 2,6-disubstituted phenols and may be represented by the formula:

$$HO-\underset{R'}{\overset{R}{\bigcirc}}-CH_2SXSCH_2-\underset{R'}{\overset{R}{\bigcirc}}-OH$$

in which R and R' are alkyl, cycloalkyl or aralkyl groups of up to 12 carbon atoms each and X is a diradical containing from 2 to about 18 carbon atoms. The diradical may be aliphatic in nature or may contain cycloaliphatic or aromatic groups. The diradical may contain, in addition, hetero atoms such as sulfur, oxygen or nitrogen, as will be disclosed in more detail below.

This invention is also concerned with a novel method for preparing these compounds. This method involves the reaction of the analogous dithiocarbamate with an alkali metal hydroxide and a dimercaptan.

In U.S. Patents 2,322,376, June 22, 1943, and 2,417,118, Mar. 11, 1947, R. F. McCleary and S. M. Roberts disclosed as new compounds useful as lubricating oil additives compounds of the type:

$$R_y-\underset{}{\overset{X_n}{\bigcirc}}-(CH_2SR_1)_z$$

wherein R is a radical selected from the group consisting of hydrogen and a hydrocarbon radical, $R_1$ is a hydrocarbon radical, X is a substituent selected from the group consisting of hydroxyl radicals and metal substituted hydroxyl radicals and $n$, $y$ and $z$ are integers of at least one.

In U.S. Patent 2,472,318, June 7, 1949, Phillip Subhow disclosed the use of compounds of the type:

RSR'SR as oxidation inhibitors for lubricating oils, wherein R is one of the groups taken from the class consisting of an aryl, alkyl aryl and substituted aryl, alkyl aryl groups, S is sulfur and R' is a low molecular weight alkyl group. Among the possible structures listed was included:

$$CH_3-\underset{OH}{\overset{CH_3}{\bigcirc}}-S-\underset{CH_3}{\overset{CH_3}{\underset{|}{C}}}-CH_2CH_2-\underset{CH_3}{\overset{CH_3}{\underset{|}{C}}}-S-\underset{OH}{\overset{CH_3}{\bigcirc}}-CH_3$$

This invention differs from the prior art in the following ways:

(1) The series of compounds of this invention is previously unreported. Such compounds are herein disclosed for the first time.

(2) The compounds described by McCleary and Roberts are monocyclic phenols which contain the grouping —$CH_2SR$ in which R is an alkyl group. A mercaptan is used as a reactant to prepare such a compound.

On the other hand, the compounds of this invention employ a dimercaptan as a reactant. The compounds of this invention are therefore bis-phenols linked through this difunctional reactant. This marked structural difference is pointed up by the distinctive superiority in antioxidant activity of the compounds of this invention over compounds of the type disclosed by McCleary and Roberts.

(3) The compounds of this invention differ from those proposed by Subhow which are aromatic sulfides, the sulfur atom being attached directly to the aromatic ring. The compounds of this invention, being functionally different from those proposed by Subhow, are therefore not homologous.

(4) My method of preparation of these new compounds is also novel.

The compounds of this invention may be prepared by treating two molar equivalents of a phenolic intermediate compound of the formula:

$$R-\underset{CH_2S\overset{O}{\overset{||}{C}}NR''_2}{\overset{OH}{\bigcirc}}-R'$$

in which R and R' are alkyl, cycloalkyl or aralkyl groups of up to 12 carbon atoms and R" is a lower alkyl (1 to 4 carbon atoms) group with at least two molar equivalents of an alkali metal hydroxide and one molar equivalent of a dimercaptan of the general formula:

HSXSH in which X is a diradical containing from 2 to about 18 carbon atoms. The diradical may be aliphatic in nature or may contain cycloaliphatic or aromatic groups. The diradical may contain, in addition, hetero atoms such as sulfur, oxygen or nitrogen. Thus, for example, X may be:

(a) A polymethylene diradical of the formula

—$(CH_2)_n$— wherein $n$ is a whole number from 2 to 12, for example —$CH_2CH_2$— and —$(CH_2)_{12}$—.

(b) A branched chain polyalkylene diradical of the formula:

$$-\underset{R}{\overset{R}{\underset{|}{\overset{|}{C}}}}-\left(\underset{R}{\overset{R}{\underset{|}{\overset{|}{C}}}}\right)_n-\underset{R}{\overset{R}{\underset{|}{\overset{|}{C}}}}-$$

wherein $n$ is a whole number from 0 to 9 and the R groups may be hydrogen or alkyl groups and at least one of the R groups is an alkyl group, for example $$-CH_2-CH(CH_3)-$$

and $-CH_2-C(CH_3)_2-CH_2-$.

(c) An aralkyl diradical of the formula:

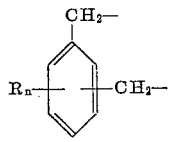

wherein R is an alkyl group of 1 to 4 carbon atoms and $n$ is a whole number from 0 to 4, for example:

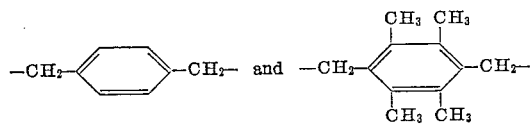

(d) Aralkyl diradicals of the formulae:

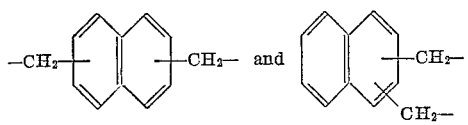

(e) An aromatic diradical of the formula:

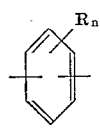

wherein R is an alkyl radical and $n$ is a whole number from 0 to 4, for example:

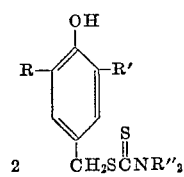

(f) An aromatic diradical of the formula:

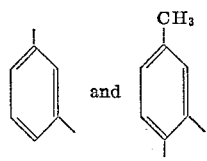

wherein Z is selected from the group consisting of —O—, —S—, —SO$_2$—.

(g) An aromatic diradical of the formula:

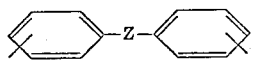

(h) A cyclic hydrocarbon containing diradical of the general formula:

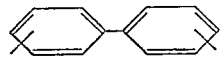

wherein R may be hydrogen or an alkyl group and $n$ is a whole number from 0 to 6, for example:

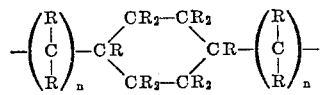

(i) An aliphatic diradical containing hetero atoms of the general formula:

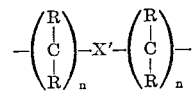

wherein R may be hydrogen or alkyl, $n$ is a whole number from 1 to 6 and X' is selected from the group consisting of —O—, —S—, —SO$_2$— and —NR'— (wherein R' is an alkyl group), for example: —CH$_2$CH$_2$OCH$_2$CH$_2$—, —CH$_2$CH$_2$SCH$_2$CH$_2$— and —CH$_2$CH$_2$SO$_2$CH$_2$CH$_2$—.

(j) A diradical of the formulae:

$$-CH_2CH_2OCH_2CH_2OCH_2CH_2-$$

and $$-CH_2CH_2OCH_2OCH_2CH_2-$$

(k) A diradical of the formula:

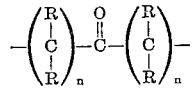

wherein R may be hydrogen or alkyl and $n$ is a whole number from 1 to 5, for example:

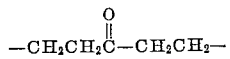

The reaction is generally carried out in a suitable water miscible solvent such as methanol, ethanol, isopropanol, dioxane, ethylene glycol dimethyl ether, etc. The reaction may be carried out from about room temperature (e.g. 20° C.) to 100° C. or more. In practice it is usually conducted at the reflux temperature of the reaction mixture which is ordinarily from about 60° C. to 100° C.

The equation for this reaction is as follows:

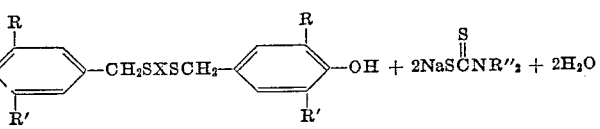

The intermediate compounds may be prepared from 2,6-dialkylphenols by reaction with formaldehyde, a dialkylamine and carbon disulfide in a manner similar to that described by A. F. Hardman in U.S. Patent 2,757,-174, July 31, 1956.

The 2,6-dialkylphenols which may be used include 2,6-dimethylphenol, 2 - methyl-6-t-butylphenol, 2,6-diisopropylphenol, 2,6-di-t-butylphenol, 2-methyl-6-cyclohexylphenol, 2 - methyl - 6-(1,1,3,3-tetramethylbutyl)-phenol, 2,6 - di - (1,1,3,3-tetramethylbutyl)phenol, 2-methyl-6-(alpha - methylbenzyl)phenol and 2-methyl-6-(alpha,alpha-dimethylbenzyl)phenol.

Any dialkylamine may be used but the low molecular weight members such as dimethylamine are preferable.

Particularly preferred substituted phenols for use as intermediates in the invention are the 3,5-dialkyl-4-hydroxybenzyl N,N-dimethyldithiocarbamates.

The dimercaptans (dithiols) which may be reacted with the above-mentioned intermediates include the following:

(a) 1,2-ethanedithiol, 1,4-butanedithiol, 1,10-decanedithiol
(b) 2,2-dimethyl-1,3-propanedithiol
(c) alpha,alpha'-dimercapto-p-xylene, bis(mercaptomethyl) durene
(d) bis(mercaptomethyl)naphthalene
(e) toluenedithiol
(f) p,p' - oxybis(thiophenol), (4,4' - dimercaptodiphenyl ether)
(g) dimercapto diphenyl
(h) 2-mercaptoethyl-4-mercaptocyclohexane (i) beta,beta'-dimercaptodiethyl ether, beta,beta'-dimercaptodiethyl sulfide, beta,beta'-dimercaptodiethyl methylamine
(j) 1,2-bis(beta-mercaptoethoxy)ethane
(k) beta,beta'-dimercaptodiethyl ketone Particularly preferred products of the invention are those derived from dimercaptans of the formula HSXSH in which X is as defined previously and is selected from the group consisting of:

(I) Polymethylene diradicals of the formula

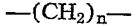

wherein $n$ is a whole number from 2 to 12.

(II) Aralkyl diradicals of the formula:

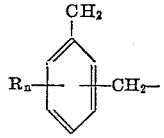

wherein R is an alkyl group of 1 to 4 carbon atoms and $n$ is a whole number from 0 to 4.

(III) Aromatic diradicals of the formula

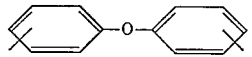

(IV) Aromatic diradicals of the formula

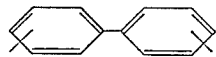

(V) Aliphatic diradicals of the formula

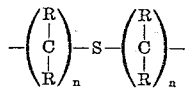

wherein R is selected from the group consisting of hydrogen and alkyl (e.g., 1–4 carbon atoms) and $n$ is a whole number from 0 to 6, and (VI) Aliphatic diradicals of the general formula:

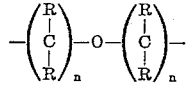

wherein R is selected from the group consisting of hydrogen and alkyl (e.g. 1–4 carbon atoms) and $n$ is a whole number from 0 to 6.

Preferred products (i.e., those resulting from combination of the described preferred phenolic intermediate compounds and the described preferred dimercaptans) include:

bis(3-alkyl-4-hydroxy-5-alkyl benzylthio)-alkanes;
bis(3-alkyl-4-hydroxy-5-alkyl benzylthio)-alkylbenzenes;
bis(3-alkyl-4-hydroxy-5-alkyl benzylthio)dialkyl ethers;
bis(3-alkyl-4-hydroxy-5-alkyl benzylthio)-dialkylbenzenes;
bis(3-alkyl-4-hydroxy-5-alkylbenzylthio)dialkyl sulfides;
bis(3-alkyl-4-hydroxy-5-alkylbenzylthio)biphenyl; and
bis(3-alkyl-4-hydroxy-5-alkyl benzylthio) diphenyl ethers, in which the alkyl groups contain up to 12 carbon atoms.

*Example 1*

Preparation of 1,2-bis(3,5-di-t-butyl-4-hydroxybenzylthio)ethane.

3,5-di-t-butyl-4-hydroxybenzyl N,N-dimethyl-dithiocarbamate is first prepared as follows:

2,6-di-t-butylphenol (103 g., 0.5 mole), 37% aqueous formaldehyde (40.5 g., 0.5 mole), 25% aqueous dimethylamine (90 g., 0.5 mole), carbon disulfide (40 g., 0.52 mole) and 400 ml. of ethanol were combined in a one-liter, 3-neck flask and heated slowly during 1½ hours to reflux with stirring. The solution was then refluxed for an additional 1½ hours, a precipitate beginning to separate after 30 minutes. The mixture was then cooled and the product was filtered off, washed with ethanol, and dried. The yield of 3,5-di-t-butyl-4-hydroxybenzyl N,N-dimethyldithiocarbamate was 152 g. (90%), M.P. 141–142° C.

A solution of 95 g. (0.28 mole) of 3,5-di-t-butyl-4-hydroxybenzyl N,N'-dimethyldithiocarbamate, 13 g. (0.14 mole) of 1,2-ethanedithiol and 47 ml. (0.28 mole) of 6 N NaOH in 400 ml. of ethanol was stirred and heated under reflux for ten minutes. A precipitate formed and the solution was cooled and filtered. The product was washed with ethanol and dried yielding 67 g. (90%) of 1,2-bis(3,5-di-t-butyl-4-hydroxybenzylthio)ethane, M.P. 142–143° C.

*Analysis.*—Calc'd: Percent S=12.05. Found: Percent S=12.36, 12.25.

*Example 2*

Preparation of alpha,alpha'-bis(3-methyl-4-hydroxy-5-t-butylbenzylthio)-p-xylene.

3-methyl-4-hydroxy-5-t-butylbenzyl N,N-dimethyl-dithiocarbamate was first prepared as follows:

2-methyl-6-t-butylphenol (164 g., 1 mole), 37% aqueous formaldehyde (81 g., 1 mole), 25% aqueous dimethylamine (180 g., 1 mole), carbon disulfide (80 g., 1.05 mole) and 450 ml. of ethanol were combined in a 2-liter, 3-neck flask and heated under reflux with stirring for 3 hours. The product separated as an oil which crystallized when the mixture was cooled. The mixture was filtered and the product was washed with ethanol and dried. The yield of 3-methyl-4-hydroxy-5-t-butylbenzyl N,N-dimethyldithiocarbamate was 251 g. (85%), M.P. 103–105° C.

A solution of 17 g. (0.1 mole) of alpha,alpha'-dimercapto-xylene, 15 g. (0.22 mole) of potassium hydroxide (85% active) and 20 ml. of water in 300 ml. of methanol was placed in a 500 ml. Erlenmeyer flask. To this solution was added 59.4 g. (0.2 mole) of 3-methyl-4-hydroxy-5-t-butylbenzyl N,N-dimethyldithiocarbamate and the mixture was heated on the steam bath for about one hour. The mixture was then cooled and the precipitate was filtered off, washed with methanol and dried yielding 46 g. (88%) of alpha,alpha'-bis(3-methyl-4-hydroxy-5-t-butylbenzylthio)-p-xylene, M.P. 141–142° C.

*Analysis.*—Calc'd: Percent S=12.27. Found: Percent S=12.40, 11.74.

*Example 3*

Preparation of 1,4-bis(3-methyl-4-hydroxy-5-t-butylbenzylthio) butane.

3-methyl-4-hydroxy-5-t-butylbenzyl N,N-dimethyl-dithiocarbamate (45 g., 0.15 mole), 9.1 g. (0.075 mole) of 1,4-dimercaptobutane, 25 ml. (0.15 mole) of 6 N sodium hydroxide and 50 ml. of ethylene glycol dimethyl ether were mixed and heated under reflux for ten minutes. The clear solution was then cooled and poured into cold water. The product separated as an oil and shortly solidified. The yield of white crystals was 35 g. (98%), M.P. 96–98° C. after recrystallization from hexane.

*Analysis.*—Calc'd: Percent S=13.50. Found: Percent S=13.60, 13.76.

*Example 4*

Preparation of beta,beta'-bis(3,5-di-t-butyl-4-hydroxybenzylthio)diethyl ether.

3,5-di-t-butyl-4-hydroxybenzyl N,N-dimethyl dithiocarbamate (34 g., 0.1 mole), beta, beta'-dimercaptodiethyl ether (6.9 g., 0.05 mole), 6 N sodium hydroxide (17.5 ml., 0.1 mole) and ethylene glycol dimethyl ether (40 ml.) were mixed and heated under reflux for 10 minutes. A clear solution formed and was cooled and poured into 200 ml. of ice water. The product oiled out and then solidified. It was filtered off and washed with 50% aqueous ethanol. The yield of the white solid product was 29 g. (100%). A portion recrystallized from hexane had M.P.=89–92° C.

*Analysis.*—Calc'd: Percent S=11.15. Found: Percent S=11.08, 11.29.

Example 5

Preparation of 4,4'-bis(3,5-di-t-butyl-4-hydroxybenzylthio)diphenyl ether.

Thirty-four grams (0.1 mole) of 3,5-di-t-butyl-4-hydroxybenzyl N,N-dimethyldithiocarbamate, 11.7 g. (0.05 mole) 4,4'-dimercaptodiphenyl ether, 17 ml. (0.1 mole) 6 N sodium hydroxide solution and 100 ml. of ethanol were mixed and refluxed for 15 minutes. During reaction a precipitate formed. The mixture was cooled and the product was filtered off, washed with ethanol-water (2:1) and dried. The yield of 4,4'-bis(3,5-di-t-butyl-4-hydroxybenzylthio)diphenyl ether was 26 g. (80%), M.P.=126–128° C. after recrystallization from benzene.

Example 6

Preparation of 3,4-bis(3,5-di-t-butyl-4-hydroxybenzylthio)toluene.

To a solution of 6.5 g. (0.042 mole) of toluene-3,4-dithiol and 7 g. (0.1 mole) of 85% potassium hydroxide in 10 ml. of water and 100 ml. of ethanol was added 28.2 g. (0.084 mole) of 3,5-di-t-butyl-4-hydroxybenzyl N,N-dimethyldithiocarbamate. The solution was heated at reflux for 15 minutes. It was then poured into water and the organic product was extracted with hexane-ether. The extract was dried with anhydrous potassium carbonate and evaporated on the steam bath. The yield of 3,4-bis(3,5-di-t-butyl-4-hydroxybenzylthio)toluene was 24 g. (96%), M.P. 114–117° C. after recrystallization from hexane.

Example 7

Preparation of alpha,alpha'-bis(3,5-di-t-butyl-4-hydroxybenzylthio)-p-xylene.

A solution of 8.5 g. (0.05 mole) of alpha,alpha'-dimercapto-p-xylene and 8 g. (0.1 mole) of 50% sodium hydroxide in 50 ml. of ethanol was added to a slurry of 33.9 g. (0.1 mole) of 3,5-di-t-butyl-4-hydroxybenzyl N,N-dimethyldithiocarbamate in 200 ml. of hot ethanol. The mixture was heated at reflux for 15 minutes. It was then cooled and the crystalline product was filtered off, washed with ethanol and dried. The yield of alpha,alpha'-bis(3,5-di-t-butyl-4-hydroxybenzylthio)-p-xylene was 28 g. (93%), M.P. 181–183° C.

Example 8

Preparation of beta,beta'-bis(3,5-di-t-butyl-4-hydroxybenzylthio)diethyl sulfide.

A solution of 34 g. (0.1 mole) of 3,5-di-t-butyl-4-hydroxybenzyl N,N-dimethyldithiocarbamate, 7.7 g. (0.05 mole) of beta,beta'-dimercaptodiethyl sulfide and 17.5 ml. (0.1 mole) of 6 N sodium hydroxide in 40 ml. of ethylene glycol dimethyl ether was heated at reflux for ten minutes. The solution was cooled and poured into 200 ml. of ice water. The product separated as an oil and was extracted with 100 ml. of benzene. The benzene extract was washed with water and the benzene was evaporated off on the steam bath. The residual oil was dried further in a vacuum oven at 80° to give the product as a viscous oil. The yield of beta,beta'-bis(3,5-di-t-butyl-4-hydroxybenzylthio)diethyl sulfide was 29.5 g. (99%).

*Analysis.*—Calc'd: Percent S=16.3. Found: Percent S=16.9.

Example 9

Preparation of p,p'-bis(3,5-di-t-butyl-4-hydroxy-benzylthio)biphenyl.

To a solution of 2.2 g. (0.01 mole) of p,p,'-dimercapto-biphenyl and 1.6 g. (0.02 mole) of 50% sodium hydroxide in 50 ml. of ethanol was added 6.8 g. (0.02 mole) of 3,5-di-t-butyl-4-hydroxybenzyl N,N-dimethyldithiocarbamate. The solution was heated at reflux for 30 minutes. It was then cooled and the precipitated product was filtered off, washed with ethanol and dried. The yield of p,p'-bis(3,5-di-t-butyl-4 - hydroxybenzylthio)biphenyl was 3.7 g. (56%), M.P. 200–205° C.

Example 10

Preparation of beta,beta'-bis(3-methyl-4-hydroxy-5-t-butylbenzylthio)diethyl ether.

A solution of 297 g. (1 mole) of 3-methyl-4-hydroxy-5-t-butylbenzyl N,N-dimethyldithiocarbamate, 69 g. (0.5 mole) of beta,beta'-dimercaptodiethyl ether and 170 ml. (1 mole) of 6 N sodium hydroxide in 360 ml. of ethylene glycol dimethyl ether was heated at reflux for 10 minutes. The solution was cooled and diluted with 500 ml. of water. The oil which separated was extracted with a mixture of 500 ml. of hexane and 100 ml. of benzene. The extract was washed with water, dried with anhydrous sodium sulfate, and evaporated on the steam bath to the product, a viscous oil. The yield of beta,beta'-bis(3-methyl-4-hydroxy-5-t-butylbenzylthio)diethyl ether was 244 g. (quantitative).

Example 11

This example demonstrates the usefulness of the compounds of this invention as antioxidants for rubber. Films prepared from a butadiene-styrene carboxylated latex and containing two parts of the antioxidant per 100 parts of rubber were placed in a 270° F. oven and observed for signs of resinification.

| Antioxidant: | Time to resinify, hours |
|---|---|
| (1) None | 10 |
| (2) 2-methyl - 4 - (benzylthiomethyl) - 6 - t-butylphenol | 44 |
| (3) 2,6 - di - t - butyl - 4 - (beta-hydroxyethylthiomethyl)phenol | 44 |
| (4) Beta,beta' - bis(3,5 - di - t - butyl - 4 - hydroxybenzylthio)diethyl ether | 995 |
| (5) Alpha,alpha' - bis(3 - methyl - 4 - hydroxy-5-t-butylbenzylthio)-p-xylene | >995 |

The striking superiority of the compounds of this invention (4 and 5) over compounds of the type described by McCleary and Roberts (2 and 3) is evident.

Example 12

This example demonstrates the usefulness of the compounds of the invention as stabilizers in polypropylene. In the method used to evaluate the compounds of this invention, 90 mil thick films of the polymer containing 0.3% of the antioxidant and 0.3% of dilauryl thiodipropionate were aged in a circulating air oven maintained at 300° F. The degradation of the polymer sample is readily evident in crazing on the surface or discoloration and crumbling of the edges, the first sign of which is considered to be the break point. Polypropylene containing 0.3% of dilauryl thiodipropionate alone degraded in 12 days.

| Antioxidant: | Days to degrade |
|---|---|
| (1) 1,2 - bis(3,5 - di - t - butyl - 4 - hydroxybenzylthio)ethane | 53 |
| (2) Beta,beta' - bis(3,5 - di - t - butyl - 4 - hydroxybenzylthio)diethyl ether | 56 |
| (3) Alpha,alpha' - bis(3 - methyl - 4 - hydroxy-5-t-butylbenzylthio)-p-xylene | 62 |
| (4) Alpha,alpha' - bis(3,5 - di - t - butyl - 4 - hydroxybenzylthio)-p-xylene | 67 |

Example 13

A natural rubber composition was prepared in accordance with the following recipe:

*Masterbatch No. 1*

| | |
|---|---|
| Pale crepe | 98.65 |
| Zinc oxide (XX72) | 10.00 |
| Lithopone | 60.00 |
| Finely divided CaCO₃ (whiting) | 60.00 |
| Zinc laurate (Laurex) | 0.50 |
| Sulfur | 3.00 |
| Masterbatch No. 2 | 1.50 |
| | 233.65 |

*Masterbatch No. 2*

| | |
|---|---|
| Pale crepe | 90.0 |
| Tetramethylthiuram monosulfide (Monex) | 10.0 |
| | 100.0 |

The antioxidants (1 part) were then milled into 233.65 parts of masterbatch No. 1 and samples were cured at 274° F. for 30 minutes. Tensile bars were aged in an oxygen bomb for 96 hours at 70° C. The percent retention of tensile strength after aging demonstrates the activity of the compounds as rubber antioxidants.

| Compound: | Percent tensile retained |
|---|---|
| Blank | 0 |
| Beta,beta' - bis(3 - methyl - 4 - hydroxy - 5 - t-butyl-benzylthio)diethyl ether | 43 |
| Beta,beta' - bis(3,5 - di - t - butyl - 4 - hydroxy-benzylthio)diethyl sulfide | 55 |

*Example 14*

This example demonstrates the usefulness of the compounds of the invention as fat antioxidants using the Schaal oven aging test. Prime steam pork fat, 150 g., was melted and 15 mg. of the chemical mixed in. A peroxide number by the potassium iodide-starch method was then taken as the zero reading. The samples were placed in a 60° C. oven and readings were taken after 3 days and then at one or two week intervals. A peroxide number of 30 is considered to be failure.

| Compound: | Days to failure |
|---|---|
| Blank | 7 |
| Beta,beta' - bis(3,5 - di - t - butyl - 4 - hydroxybenzylthio)diethyl ether | 48–63 |
| Beta,beta' - bis(3 - methyl - 4 - hydroxy - 5 - t-butylbenzylthio)diethyl ether | >63 |
| Alpha,alpha' - bis(3 - methyl - 4 - hydroxy - 5 - t-butylbenzylthio)-p-xylene | >63 |

In general, the chemicals of the invention may be used as antioxidants in organic materials normally subject to oxidative deterioration, especially rubbers, whether natural or synthetic, particularly diolefin polymers, e.g. polybutadiene, polyisoprene, copolymers of butadiene with styrene, acrylonitrile, vinyl pyridine or other monomers, copolymers of isoprene with isobutylene or other monomers, as well as ethylene-propylene rubbery polymers, whether saturated or unsaturated (e.g. terpolymers of ethylene, propylene and dicyclopentadiene or 1,4-hexadiene), polyurethanes, blends of rubbers with plastics (e.g. mixtures of styrene-acrylonitrile resin with butadiene-acrylonitrile rubber), graft copolymers (e.g. graft copolymers of styrene and acrylonitrile on polybutadiene), various plastics such as polyvinyl chloride, polystyrene, polyethylene, polypropylene; similarly, animal fat, fish oil, vegetable fat, petroleum products (fuels, lubricating oils and greases) may be protected from oxidation.

Having thus described my invention, what I claim and desire to protect by Letters Patent is:

1. A composition comprising an organic material normally subject to oxidative deterioration, in intimate admixture with, in amount effective to protect said organic material against oxidation, a chemical of the formula

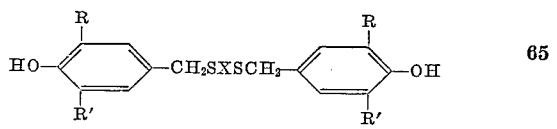

in which R and R' are selected from the group consisting of alkyl, cycloalkyl and aralkyl groups having up to 12 carbon atoms and X is a diradical having from 2 to 18 carbon atoms, the said diradical X being selected from (a) polymethylene diradicals of the formula

wherein $n$ is a whole number from 2 to 12;

(b) branched chain polyalkylene diradicals of the formula;

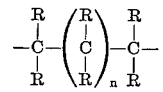

wherein $n$ is a whole number from 0 to 9 and the R groups are hydrogen or alkyl and at least one of the R groups is an alkyl group;

(c) aralkyl diradicals of the formula:

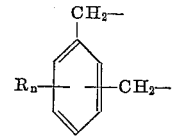

wherein R is an alkyl group of 1 to 4 carbon atoms and $n$ is a whole number from 0 to 4;

(d) aralkyl diradicals of the formulae:

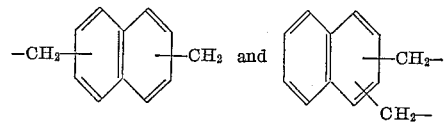

(e) aromatic diradicals of the formula:

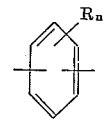

wherein R is an alkyl radical and $n$ is a whole number from 0 to 4;

(f) aromatic diradicals of the formula:

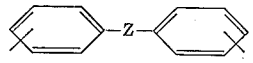

wherein Z is —O—, —S— or —SO$_2$—;

(g) aromatic diradicals of the formula

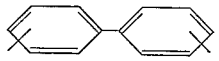

(h) cyclic hydrocarbon containing diradicals of the formula:

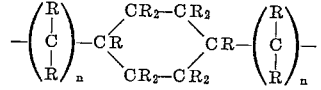

wherein R is hydrogen or an alkyl group and $n$ is a whole number from 0 to 6;

(i) aliphatic diradicals containing hetero atoms of the formula:

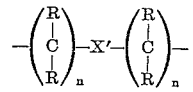

wherein R is hydrogen or alkyl, $n$ is a whole number from 1 to 6 and X' is —O—, —S—, —SO$_2$—, or —NR'— (wherein R' is an alkyl group);

(j) diradicals of the formulae:

—CH$_2$CH$_2$OCH$_2$CH$_2$OCH$_2$CH$_2$— and

—CH$_2$CH$_2$OCH$_2$OCH$_2$CH$_2$— and (k) diradicals of the formula:

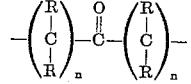

wherein R is hydrogen or alkyl and $n$ is a whole number from 1 to 5.

2. A composition as in claim 1 in which the said organic material is a rubber.

3. A composition as in claim 1 in which the said organic material is polypropylene.

4. A composition as in claim 1 in which the said organic material is fat.

5. A composition as in claim 1 in which the said chemical is bis(3-alkyl-4-hydroxy-5-alkylbenzylthio)alkane.

6. A composition as in claim 1 in which the said chemical is 1,2-bis (3,5-di-t-butyl-4-hydroxybenzylthio) ethane.

7. A composition as in claim 1 in which the said chemical is bis(3-alkyl-4-hydroxy-5-alkylbenzylthio) dialkylbenzene.

8. A composition as in claim 1 in which the said chemical is alpha, alpha'-bis(3-methyl-4-hydroxy-5-t-butylbenzylthio)-p-xylene.

9. A composition as in claim 1 in which the said chemical is alpha, alpha'-bis(3,5-di-t-butyl-4-hydroxybenzylthio)-p-xylene.

10. A composition as an claim 1 in which the said chemical is bis(3-alkyl-4-hydroxy - 5 - alkylbenzylthio) dialkyl ether.

11. A composition as in claim 1 in which the said chemical is beta, beta'-bis(3,5-di-t-butyl-4-hydroxybenzylthio)diethyl ether.

12. A composition as in claim 1 in which the said chemical is beta, beta'-bis(3-methyl-4-hydroxy-5-t-butylbenzylthio)diethyl ether.

13. A composition as in claim 1 in which the said chemical is bis(3-alkyl-4-hydroxy - 5 - alkylbenzylthio) dialkyl sulfide.

14. A composition as in claim 1 in which the said chemical is beta, beta'-bis(3,5-di-t-butyl-4-hydroxybenzylthio)diethyl sulfide.

References Cited
UNITED STATES PATENTS

| | | | |
|---|---|---|---|
| 3,179,701 | 4/1965 | Rocklin | 260—398.5 |
| 3,234,177 | 2/1966 | Van Schooten | 260—45.95 |
| 3,252,911 | 5/1966 | Orloff | 260—45.95 |

DONALD E. CZAJA, *Primary Examiner.*

LEON J. BERCOVITZ, *Examiner.*

H. E. TAYLOR, *Assistant Examiner.*

Notice of Adverse Decision in Interferences

In Interference No. 96,344 involving Patent No. 3,330,804, F. X. O'Shea, USE OF CERTAIN BIS (3,5-SUBSTITUTED-4-HYDROXYBENZYL-THIO) COMPOUNDS AS ANTIOXIDANTS, final judgment adverse to the patentee was rendered Aug. 21, 1969, as to claims 1, 2, 3, 4, 5 and 6.

[*Official Gazette October 28, 1969.*]

UNITED STATES PATENT OFFICE

CERTIFICATE OF CORRECTION

Patent No. 3,330,804  July 11, 1967

Francis X. O'Shea

It is certified that error appears in the above identified patent and that said Letters Patent are hereby corrected as shown below:

In the heading to the printed specification, line 8, "Patent No. 3,260,757, dated July 12, 1966" should read -- Patent No. 3,310,587, dated March 21, 1967 --. Column 1, line 29, "3,260,757" should read -- 3,310,587 --.

Signed and sealed this 30th day of December 1969.

(SEAL)
Attest:

Edward M. Fletcher, Jr.

Attesting Officer

WILLIAM E. SCHUYLER, JR.

Commissioner of Patents